INVENTOR.
CHARLES L. SHIRLEY JR.
JAMES W. BELL
BY
*Philip J. McFarland*
ATTORNEY March 29, 1966   J. W. BELL ETAL   3,243,801
RADAR SYSTEM FOR IDENTIFYING TARGETS
Filed Nov. 19, 1963   2 Sheets-Sheet 2

INVENTOR.
CHARLES L. SHIRLEY JR.
BY   JAMES W. BELL

*Philip J. McFarland*
ATTORNEY

United States Patent Office 3,243,801
Patented Mar. 29, 1966

3,243,801
RADAR SYSTEM FOR IDENTIFYING TARGETS
James W. Bell, Sudbury, and Charles L. Shirley, Jr., Peabody, Mass., assignors to Laboratory for Electronics, Inc., Boston, Mass., a corporation of Delaware
Filed Nov. 19, 1963, Ser. No. 324,813
1 Claim. (Cl. 343—6)

This invention pertains generally to radar systems and particularly to systems of such type which are adapted to use in identifying targets by utilizing the Doppler effect.

There has always been a need for day/night, all-weather surveillance of the battlefield areas to locate and identify friend from foe. To assist in meeting such need, especially during periods of poor visibility, it is a common military technique to employ radar to detect moving targets. A skilled radar observer can classify moving targets, distinguishing men from vehicles, jeeps from tanks, etc. Unlike a visual observer, however, the radar observer is unable to distinguish moving targets as friendly or hostile since the radar echoes, or "signature," from either friend or foe are identical. Consequently, radar observation alone serve merely to alert the observer to the fact that a moving target is located at a certain point within the zone of observation.

To maintain aggressive and continuous reconnaissance, patrols are used extensively in tactical situations in which light, weather, or terrain conditions significantly restrict visual observation. Such patrols, at least when returning to a defense perimeter, obviously may be mistaken for enemy forces. Under adverse visibility conditions the allowable reaction time for perimeter security to identify targets is almost always very short. It becomes highly important, therefore, that identification of intruders within the vicinity of a defense perimeter be rapidly accomplished to minimize the chances of conflict between friendly forces, and to permit timely reaction against unfriendly intruders.

Obviously, some form of the classic, Challenge, Reply, and Personal Identification must take place. It is easy to furnish a patrol with a radio-receiver with which communication can be established between friendly forces when the patrol enters a defense perimeter monitored by a friendly radar.

It is more difficult, however, for the patrol to identify itself without disclosing its position or any other information to hostile forces. Obviously, then, any equipment used as a means of identification between friendly elements must not compromise the security of either element. To achieve this, the friendly element entering the field of a surveillance radar must be provided with some means of determining, without revealing the element's position, when penetration of the friendly radar field occurs. Further, since equipment issued to members of a patrol is often captured by hostile forces, any identification means must be immune to compromise. Therefore, the employment of a fully-automatic personnel identification friend or foe system is completely unacceptable since hostile forces using a captured automatic unit could penetrate perimeter defenses under the guise of friendly forces. The system design must therefore provide some method whereby the authenic possessor of an IFF unit can transmit a unique identification.

The most practical method of insuring the authenticity of IFF responses is to devise a system which provides: (1) a positive alert to the friendly intruder; and (2) a silent, secure transmission of a unique reply to a discrete address, the transmission being on a non-programmed real-time basis. In addition, an acceptable IFF system must have design characteristics which: (1) insure reliable operation under extreme environmental conditions; (2) may be carried by a man without interfering with the primary mission of the wearer. Further, since any personnel IFF system should be usable by persons of all types, ranging from highly-skilled specialists to semi-trained indigenous forces, simplicity of operation is of great importance. Finally, it is highly desirable that any system provide means, with a minimum of equipment, for secure transmission of information, other than identifying signals, which may be of value in tactical situations.

Therefore it is a primary object of this invention to provide an improved target identifying system wherein radar signals reflected from targets are first translated in frequency and are coded by modulating signals impressed on such reflected signals at a target so as to return a uniquely modulated signal to an interrogating radar.

Another object of the invention is to provide a Doppler radar system wherein energy impinging on a target may be modulated as desired before such energy is reflected back to its origin.

Still another object of this invention is to provide, in a radar system, means for alerting an observer to the fact that radio-frequency energy is being directed toward him without detracting from tactical efficiency of the user.

Still another object of this invention is to provide simple, tamperproof and lightweight apparatus for meeting the foregoing objects.

These and other objects of the invention are attained generally by providing a system comprising a Doppler radar transmitter/receiver unit utilizing a directive antenna to detect all moving targets within a field under observation, and means carried by a friendly soldier first to produce a warning signal when energy from the transmitter is received by such target and then to produce, at the will of the friendly soldier, a Doppler-shifted signal carried on the energy reflected back to the receiver. As a result, then, the signal returned from the friendly soldier may be made to differ from the return from all other targets and to be coded in a unique manner. For a more complete understanding of the invention, reference is now made to the following detailed description of the drawings, in which:

Figure 1:
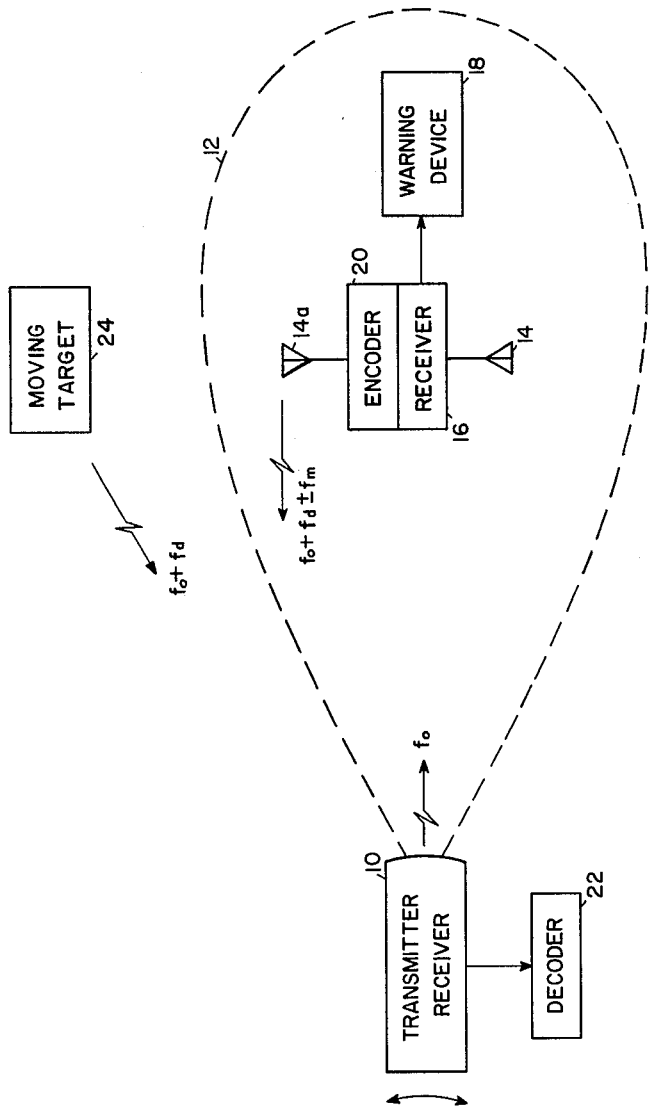
FIG. 1 is a sketch showing generally the arrangement of the various elements in a system according to a preferred embodiment of the invention.

Referring now to FIG. 1, transmitter/receiver 10, which may be a model S–5 radar manufactured by the Automatic Signal Division of Laboratory for Electronics, Inc., Norwalk, Connecticut, emits a beam 12 of microwave energy at a frequency designated $f_0$. When the transmitted energy illuminates a friendly soldier carrying the to be described equipment, such energy passes through a receiving antenna 14 and a receiver 16 to actuate a warning device 18. The latter element may be a microphone, a lamp, or a tactile device. Thus, a signal indicating illumination by the beam 12 alerts the friendly soldier.

When the beam 12 illuminates the antenna 14 and the antenna 14a is also illuminated. The friendly soldier may actuate an encoder 20, which element is described in more detail hereinafter, so as to modulate, according to a predetermined program, the received frequency $f_0$ with a frequency $f_m$. Therefore, the signal returned to the transmitter/receiver 10 (wherein it is amplified and detected and passed to a decoder 22) from the friendly soldier is of a frequency $f_0+f_d\pm f_m$, where $f_d$ indicates the Doppler shift due to the motion of the friendly soldier and $f_m$ indicates a modulation frequency controlled by the friendly soldier by means described hereinafter. When the beam 12 is scanned so as to illuminate another moving target 24, the signal returned from such a target is at a frequency $f_0+f_d$, where $f_d$ here equals the Doppler frequency due to motion of the target 24. This signal differs in frequency and in character from the signal returned from the friendly soldier, thus alerting the personnel at the transmitter/receiver 10.

Figure 2:
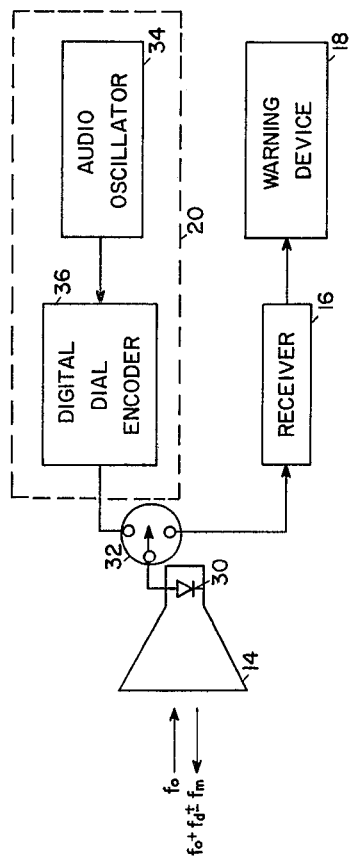
FIG. 2 is a block diagram of the element carried by a friendly target and shown in FIG. 1; and, FIG. 3 is a block diagram of a radar transmitter/receiver adapted to use in the system of FIG. 1.

Referring now to FIG. 2 the principles of construction and operation of the apparatus carried by the friendly soldier may be clearly seen. Thus, energy from the transmitter/receiver 10 of FIG. 1 illuminates a conventional antenna 14. The actual dimensions of the antenna 14 are, of course, not critical to the invention. The antenna 14 is terminated in a cavity in which a detector, as a diode 30, is mounted. The diode 30 is connected to a switch 32 which is ordinarily positioned in its "down" position to energize a receiver 16 and a warning device 18. It will be obvious, then, that the presence of energy at the frequency $f_0$ will produce a signal in the warning device 18 to alert the friendly soldier. The switch 32 may then be placed in its "up" position to connect an encoder 20 in circuit with the cavity through the diode 30. The encoder 20 consists of an audio oscillator 34 operating at a frequency $f_m$ (which frequency preferably is greater than the greatest possible Doppler shift frequency) and a digital dial encoder 36. The latter element may be a conventional telephone dial. It may be seen, therefore, that the signal impressed on the diode 30 is a series of pulses at a frequency $f_m$, the length of each pulse being controlled by the numbers dialed on the digital dial encoder 36, so that the signal returned from the antenna 14 contains the frequencies $f_0$, $f_d$ and $f_m$.

Figure 3:
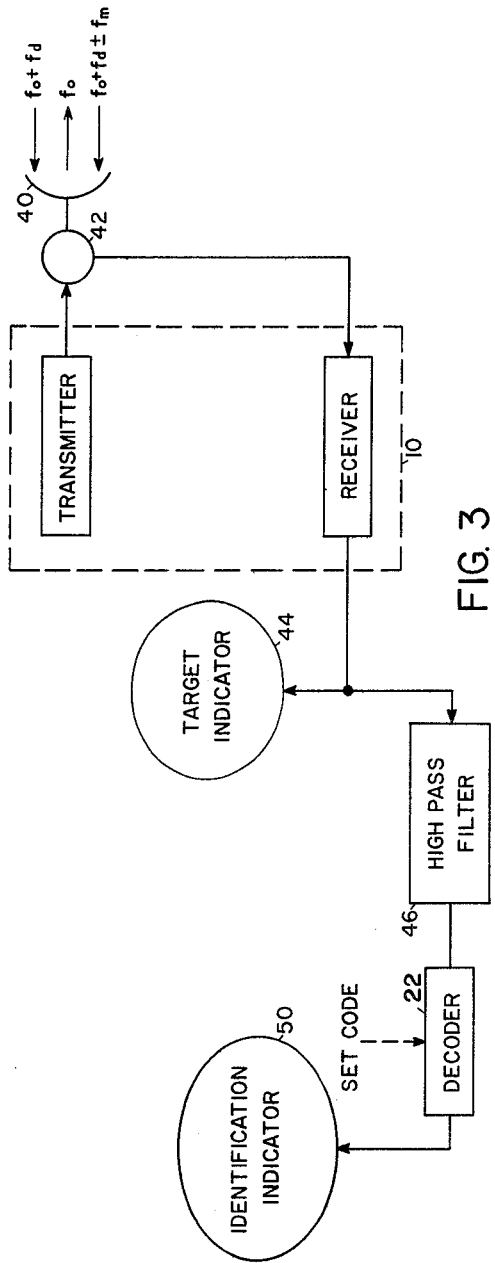

Referring now to FIG. 3, it may be seen that the signals returned from target 24 and from the friendly soldier are received by a conventional antenna 40 and passed through a duplexer 42 to the receiver portion of the transmitter/receiver 10. The signal out of the receiver is impressed on a target indicator 44, which preferably may be a conventional frequency meter. At the same time a portion of the signal out of the receiver is passed through a high pass filter 46 (which element rejects the Doppler shift components of the signals out of the receiver) to a decoder 22 to produce a signal when there is a match between the output of the high pass filter 46 and a set code impressed on the decoder 22. The output signal from the decoder 22 then is impressed on an identification indicator 50.

The system works in the following manner. Let it be assumed first that a particular combination of numbers say 5–8–4, is made the identifying code for a particular period of time and that this combination is given to a scout who is to penetrate an enemy's lines and return. As the scout returns to his own lines, he comes within range of the surveillance radar and his warning device makes him cognizant of that fact. The scout then switches his equipment to respond to the surveillance radar and dials the numbers 5–8–4. The return from the scout to the surveillance radar then is pulse modulated and shifted in frequency, the length of each pulse being set by the dialing operation and the frequency being offset by an amount equal to the frequency of the audio oscillator in the scout's equipment. It should be noted here that the carrier for the coded reply is the signal transmitted by the surveillance radar plus the Doppler frequency due to the motion of the scout relative to the surveillance radar. The signal from the scout is received at the surveillance radar to actuate the target indicator. At this point an observer knows that there is a man moving in the field of observation of the surveillance radar and that the man probably is the scout. The observer then checks the identification indicator, having first set the proper combination, here 5–8–4 into the decoder. If the identification indicator shows that the coded return is the proper one the observer may then permit the scout to approach to be identified visually. If, on the other hand, the proper code is not received from the man, then the observer may then assume the man to be probably hostile.

It will become immediately evident that the illustrated and described embodiment of the invention may be changed in many respects without departing from the inventive concepts. For example, it would be obvious that the transmitted frequency could be voice modulated and equipment carried by the scout could be modified to receive such modulated signal. Such a modification would permit transmission of a challenge which would be heard by the scout so that he would respond only when asked to reply. Further, since it is necessary only that the signal returned from friendly targets be distinguishable from all other signals, it is not essential that the illustrated coding arrangement be used. For example, the encoder may be a mechanical "chopper" actuated in accordance with a predetermined code. Still further, it will be recognized that the type of surveillance radar used is not critical. That is, the radar need not be a continuous wave radar as shown nor need it be placed on the ground. A pulsed radar on an aircraft could be used to identify an unmarked landing strip. It is felt, therefore, that the invention should not be restricted to the illustrated embodiment but rather should be limited only by the spirit and scope of the appended claim.

We claim:

Radar apparatus for differentiating targets comprising:
 (a) a radar transmitter/receiver unit for producing a beam of electromagnetic energy illuminating targets;
 (b) modulating means carried on selected ones of the targets to code the energy reflected from such targets; said modulating means comprising: an oscillator having an output signal frequency greater than the highest Doppler shift frequency impressed on the energy from any target by movement thereof relative to the radar transmitter/receiver unit; means for modulating the output signal frequency of the oscillator according to a predetermined code; and, means for impressing such modulated output signal on the signal reflected back to the radar transmitter/receiver unit,
 (c) receiving means carried by each of the selected ones of the targets to produce a warning signal whenever the beam of electromagnetic energy illuminates each such target and,
 (d) means for producing a signal, at the output of the receiver of the radar transmitter/receiver unit, indicative of the selected ones of the targets which carry the modulating means.

References Cited by the Examiner

UNITED STATES PATENTS

| | | | |
|---|---|---|---|
| 1,744,036 | 1/1930 | Brard | 343—6.8 |
| 2,899,546 | 8/1959 | Hollmann | 343—6.8 |
| 2,927,321 | 3/1960 | Harris | 343—68 X |
| 3,137,847 | 6/1964 | Kleist | 343—6.5 |
| 3,164,827 | 1/1965 | Preikschat | 343—6.5 |
| 3,169,242 | 2/1965 | Davis et al. | 343—6.5 |

CHESTER L. JUSTUS, *Primary Examiner.*

E. T. CHUNG, P. M. HINDERSTEIN,
*Assistant Examiners.*